United States Patent
Hobdy

(10) Patent No.: US 8,026,620 B2
(45) Date of Patent: Sep. 27, 2011

(54) WAVE ENERGY CONVERTER

(76) Inventor: Miles Hobdy, Fulshear, TX (US)

(*) Notice: Subject to any disclaimer, the term of this patent is extended or adjusted under 35 U.S.C. 154(b) by 463 days.

(21) Appl. No.: 12/271,743

(22) Filed: Nov. 14, 2008

(65) Prior Publication Data

US 2010/0123313 A1    May 20, 2010

(51) Int. Cl.
*H02P 9/14* (2006.01)

(52) U.S. Cl. ............................. 290/42; 290/53

(58) Field of Classification Search ............ 290/42, 290/53; 60/495–498, 501, 502; 417/330
See application file for complete search history.

(56) References Cited

U.S. PATENT DOCUMENTS

| | | | | |
|---|---|---|---|---|
| 1,399,558 A | * | 12/1921 | Howe | 416/10 |
| 1,925,742 A | * | 9/1933 | Bamber et al. | 60/505 |
| 4,423,334 A | * | 12/1983 | Jacobi et al. | 290/53 |
| 4,580,400 A | * | 4/1986 | Watabe et al. | 60/398 |
| 2009/0008942 A1 | * | 1/2009 | Clement et al. | 290/53 |
| 2010/0032946 A1 | * | 2/2010 | Begley et al. | 290/3 |

OTHER PUBLICATIONS

International Search Report and Written Opinion, Mailed Jun. 1, 2010, from PCT Application Serial No. PCT/US2009/064335.

* cited by examiner

*Primary Examiner* — Quyen Leung
*Assistant Examiner* — Naishadh Desai
(74) *Attorney, Agent, or Firm* — Egbert Law Offices PLLC

(57) ABSTRACT

A wave energy converter has a shell, a pendulum pivotally positioned in the shell, a magnet thereon, a variable inductor positioned in the shell, a pendulum adjustor for changing a center of gravity of the pendulum, a motion sensor positioned in the shell, a position sensor connected to the pendulum, a rotation sensor connected to the pendulum, and a controller connected to the motion sensor and the position sensor and the rotation sensor. The pendulum has a magnet thereon. The magnet of the pendulum oscillates adjacent the variable inductor. The variable inductor can adjust the inductive capacity.

17 Claims, 11 Drawing Sheets

WAVE ENERGY CONVERTER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the conversion of mechanical energy to electrical energy. More particularly, the present invention the relates to apparatus that convert energy provided by waves in a body of water into electricity. More particularly, the present invention relates to apparatuses utilizing magnetic induction.

2. Description of Related Art

Including Information Disclosed Under 37 CFR 1.97 and 37 CFR 1.98.

With rising oil prices, more and more efforts are being made to find alternative energy sources. Alternative energy sources include biomass (such as biodiesel), geothermal energy, solar energy, wind energy, and wave power. Wave power is a form of renewable energy. Therefore, wave power is a very desirable alternative to non-renewable sources, such as oil and coal. The apparatus that harness the energy of waves are commonly referred to as wave energy converters (WECs). The technology for wave power energy conversion is in the early stages in that much research and development is going into technology relating to the conversion of wave energy to electricity.

A WEC is device that converts the mechanical energy of the waves of a body of water, such as the ocean, into electrical energy. The electrical energy is typically in the form of electricity. The obvious benefit of utilizing the motion of waves for the production of electrical energy is the abundance of ocean waves, the low cost of converting wave energy into electrical energy, extremely low emissions in such conversion, and very little environmental impact of devices that perform such a conversion.

Many attempts to harness wave energy have yielded varying degrees of success. For example, several foreign companies have engineered and fielded new WEC concepts. Most of the companies involved in bringing these various concepts to market are located in Europe where mandates for sustainable renewable energy supplies follow the Kyoto Accord for reduction in carbon emissions. Several European nations are signatories to the Kyoto Accord and therefor have set forth various goals for implementing new power generating technologies, including onshore and offshore wind farms, WECs, and subsea turbine devices utilizing stable ocean and river currents. European nations lead the United States in the pursuit of alternative energies. For example, the Norwegian classification authority (Det Norske Veritas) has guidelines for the design and construction of WECs. Therefore, there is a need for the development of WECs in the United States.

In order to fully maximize the use of wave power, a WEC must adapt to the prevailing wave environment. That is, the apparatus must adapt to the transient amplitude, frequency, and phase of the waves of a body of water. One problem associated with WECs is that to adapt to the transient nature of waves, the apparatus of the WEC must change a mass, stiffness or damping characteristic. Many WECs are not equipped to respond to the changes in waves. The ability of a WEC to respond to transient waves requires additional components and complexity, which further compounds the potential maintenance and reliability issues of a WEC.

Another problem associated with current WECs is that the parts that convert wave energy to electrical energy are exposed directly to the environment. Therefore, these parts are subject to corrosion and disrepair. Thus, there is a need for a WEC that protects the energy-converting parts from the environment.

Various patents have been issued relating to WECs. For example, U.S. Pat. No. 7,305,823, issued on Dec. 11, 2007 to Stewart et al., discloses a wave energy converter having two elements intended to be placed in a body of water. The two elements are able to move relative to each other in response to forces applied to the wave energy converter by the body of water. At least one of the two elements is a wave energy absorber. A mechanism is connected between the two elements so as to extract energy from the wave energy converter for producing output electric energy as a function of the movement between the two elements. Another mechanism is connected between a source of energy and one of the two elements. The mechanism senses and determines the displacement, velocity, and acceleration of one of the two elements relative to the other for selectively and actively supplying energy to one of the two elements so as to cause an increase in the displacement and velocity of one of the two elements relative to the other.

U.S. Pat. No. 6,291,904, issued on Sep. 18, 2001 to Carroll, discloses an open-ended tube that is mounted in a fixed, vertical orientation within a body of water. The top and bottom ends of the tube are positioned at preselected depths relative to an average water level. The tube-top open end is disposed at a first depth approximately equal to, but not less than, the maximum preselected wave amplitude so that the top end is always submerged. The tube-bottom open end is disposed at a depth where the energy level associated with preselected waves of maximum wavelength is small. Water flows into and out of the tube in response to pressure variations caused by passing waves. A piston is disposed within the tube for converting the water flow to useful energy.

U.S. Pat. No. 7,352,073, issued on Apr. 1, 2008 to Ames, discloses an ocean wave energy converter that has a generator with a rotating inner rotor surrounded by a counter-rotating outer rotor for generating electricity. A reciprocating drive rod drives the inner rotor on the downstroke of the drive rod and the outer rotor on the upstroke of the drive rod through a gear-driven driveshaft with clutches. A buoy is attached to an end of the drive rod whereby the undulation of the ocean waves relative to the buoy reciprocates the drive rod between the upstroke and the downstroke positions.

U.S. Pat. No. 7,298,054, issued on Nov. 20, 2007 to Hirsch, discloses a wave energy conversion system that includes a base substantially connected to a wave-medium floor, a tidal platform connected to the base, and a tidal float connected to the tidal platform. An axle is connected to the tidal platform with an inductive coil positioned within the axle such that an axis of the inductive coil is parallel to the axle. A magnetic sleeve includes a magnetic sleeve opening such that the axle passes through the magnetic sleeve opening. A float member is connected to the magnetic sleeve. A moving wave causes displacement of the float member. The float member causes the magnetic sleeve to move relative to the inductive coil and to generate electrical energy within the inductive coil.

U.S. Pat. No. 5,512,795, issued on Apr. 30, 1996 to Epstein et al., discloses an electrical energy generator that has a cylindrical stator, a cylindrical liner of a piezoelectric material in concentric contact with the stator, and an armature rotatable about the liner. In one embodiment, as the armature rotates, the armature squeezes successive portions of the liner against the stator for alternately compressing and decompressing the liner portions for causing them to generate electrical energy. In another embodiment, the armature causes alternating stretching and destretching of successive portions of the liner between spaced-apart portions of the stator for causing the liner portions to generate electricity.

U.S. Pat. No. 4,748,338, issued on May 31, 1988 to Boyce, discloses an apparatus for extracting energy from the waves on a body of water that includes an assembly having a buoyancy sufficient for maintaining the assembly afloat in the water. The apparatus has a series of structures mounted on the assembly that have generally upwardly-oriented beams that have upper ends connected at least indirectly to one another. A pendulum drive shaft is suspended by a cable from the upper end of the beams. Each structure has a pulley at the upper ends of the beams through which a continuous loop of the cable passes so as to suspend the pendulum drive shaft and permit the pendulum drive shaft to rotate. A ratcheted pulley mounted at the lower end of each of the beams has a second continuous loop of cable passing therethrough. The second continuous loop of cable also loops around the pendulum drive shaft causing the pendulum drive shaft to rotate as it swings by rolling within the loop of the second cable which is anchored by the ratcheted pulley. The second cable is prevented from turning by the ratchet during the forward swing of the pendulum.

U.S. Pat. No. 4,492,875, issued on Jan. 8, 1985 to Rowe, discloses a buoy generator that has a hollow buoy having inner and outer surfaces, a winding mounted to the buoy parallel to the inner and outer surfaces, a magnetized member freely disposed in all dimensions within the hollow buoy for unrestricted rolling on the inside surface of the hollow buoy whenever the hollow buoy has any rolling movement, and a mechanism connected to an end of the windings for rectifying current flow therefrom. Upon mooring the buoy in the water, the flux lines of the magnetized roller cut the winding when there is water motion. Electrical current is provided by the winding to the rectifying mechanism.

U.S. Pat. No. 4,423,334, issued on Dec. 27, 1983 to Jacobi et al., discloses a wave motion powered electrical generator configured for installation in a buoy. The generator has an inverted pendulum with two windings formed at the free end thereof. The windings are aligned to articulate between two end stops. Each stop is provided with a magnetic circuit. As the loops thus pass through the magnetic circuit, electrical current is induced which may be rectified through a full-way rectifier to charge a battery. The buoy itself may be ballasted to have its fundamental resonance at more than double the wave frequency with the result that during each passing of a wave at least two induction cycles occur.

U.S. Pat. No. 4,352,023, issued on Sep. 28, 1982 to Sachs et al., discloses a mechanism for generating power from wave motion on a body of water. The mechanism includes a buoyant body which is adapted to float on a body of water and to roll and pitch in response to the wave motion of the water. A gyro-wave energy transducer is mounted on the buoyant body for translating the pendulum-like motions of the buoyant body into rotational motion. The gyro-wave energy transducer includes a gimbal that has first and second frames. The first frame is pivotally mounted to the second frame. The second frame is pivotally mounted to the buoyant body. A gyroscope is mounted to the first frame for rotation about an axis perpendicular to the axes of rotation of the first and second frames. A generator is coupled to the gyroscope for maintaining a controlled rotational velocity for the gyroscope. Transferring members are associated with one of the first and second frames for transferring torque of one of the first and second frames to the gyroscope.

U.S. Pat. No. 4,317,047, issued on Feb. 23, 1982 to deAlmada, discloses an apparatus for harnessing the energy derived from the undulatory motion of a body of water that includes an assembly having a buoyancy sufficient for maintaining it afloat in the water, a first structure substantially following multidirectional undulatory motions of the water, and a second structure mounted in the assembly for free movement in a plurality of planes with respect to the first structure. The second structure is displaceable by gravity and by forces derived from the motions of the first structure. A device is connected to the first and second structures for generating a pressure output in response to the force derived from the relative motions between the first and second structures. An arrangement is coupled to the pressure output of the device for utilizing, at least indirectly, the energy derived from the pressure output.

U.S. Pat. No. 4,266,143, issued on May 5, 1981 to Ng, discloses an energy conversion device which utilizes the natural movements of ocean waves to produce electrical energy. The apparatus is contained in a tank which is adapted to float near the surface of the water and tilt from side-to-side about a pivot point located below the tank, thereby simulating a pendulum-like movement. A sinker weight is employed to produce the appropriate movement of the tank and maintain the floating tank in balance at the ocean surface. The pendulum motion of the tank is used to roll gravity wheels in the tank in such manner that shafts associated with the gravity wheels are caused to rotate. Electrical generators are operatively connected to the rotating shafts for producing electrical energy from the mechanical rotational energy of the shafts as the tank tilts from side to side with the wave motion.

U.S. Pat. No. 4,260,901, issued on Apr. 7, 1981 to Woodbridge, discloses a system for converting the mechanical energy in the wave motion of a body of water into electrical energy. A frame is fixed with respect to the wave motion of the water. A flotation element is buoyantly supported by the water and constrained to follow only the vertical component of the wave motion. The motion of the flotation element is transferred to an electrical generating device which includes a device for producing electromagnetic flux and electrical coils. The motion of the flotation element causes relative motion between the flux-producing device and the electrical coils thereby generating an electromotive force. A positioning subsystem is provided for moving the electrical generating device relative to the flotation element when the average depth of the body of water changes so as to maintain a symmetrical relative motion between the flux-producing device and the electrical coils.

U.S. Pat. No. 4,251,991, issued on Feb. 24, 1981 to Wood, discloses an apparatus for generating power from the motion of a wave on a body of water that utilizes a spine formed by buoyant sections that are joined end-to-end and are ballasted so as to cause the sections to assume a predetermined position in calm water. Adjacent sections are joined in a manner enabling the sections to pivot more easily about at least one non-vertical axis when the sections are in the predetermined position. When the apparatus is subjected to wave motion the surge component of the wave motion is converted to vertical motion of the spine. Prime movers are mounted on the spine so as to rock relative to the spine under the heave component of wave motion, and under the vertical motion of the spine. The rocking motion of the prime movers is utilized to produce energy.

U.S. Pat. No. 4,110,630, issued on Aug. 29, 1978 to Hendel, discloses a wave-powered electric generator. The generator includes a buoyant envelope tethered to a fixed point relative to the sea bottom. The buoyant envelope is water and air-tight. One or more stators and one or more elements moveable by the force of inertia are positioned within the stator. The buoyant envelope is a rectifier for rectifying the electric energy generated by the moveable element. A power transmission mechanism supplies the generated and rectified electric energy to a power station. In a preferred embodiment, a conductive fluid is employed as a moveable element. The fluid is passed through a concentrated magnetic field.

U.S. Pat. No. 3,696,251 issued on Oct. 3, 1972 to Last et al., discloses an electric generator for deriving electrical energy from oscillatory motion such as that of buoys, vehicles and animals. The generator has a stator and an armature coupled together by a spring mechanism. The coupling generates current when bodily movement of the generator causes, by inertia effects, relative movement of the armature and stator.

It is an object of the present invention to provide a wave energy converter that improves power generation.

It is another object of the present invention to provide a wave energy converter that protects critical system components from direct contact with the ocean and its surrounding environment.

It is another object of the present invention to provide a wave energy converter that reduces long term maintenance costs.

It is still another object of the present invention to provide a wave energy converter that reduces inactivity due to adverse environmental conditions.

It is another object of the present invention to provide a wave energy converter that utilizes a permanent magnet.

It is still another object of the present invention to provide a wave energy converter that can be placed in any body of water having waves.

It is another object of the present invention to provide a wave energy converter that utilizes magnetic induction to convert wave energy into electrical energy.

It is still another object of the present invention to provide a wave energy converter that maximizes energy conversion for various wave frequencies.

It is another object of the present invention to provide a wave energy converter that maximizes energy conversion for various wave sizes.

It is another object of the present invention to provide a wave energy converter that varies inductive capacity.

These and other objects and advantages of the present invention will become apparent from a reading of the attached specification and appended claims.

BRIEF SUMMARY OF THE INVENTION

The present invention is a wave energy converter comprising a shell, a pendulum pivotally positioned in the shell, a variable inductance means for varying an inductive capacity positioned in the shell, and a pendulum adjusting means for changing a position of a center of gravity of the pendulum. The pendulum has a magnet thereon. The variable inductance means has at least one wire coil. The magnet of the pendulum oscillates adjacent the wire coil. The wave energy converter further comprises a motion sensor positioned in the shell, a position sensor connected to the pendulum, a rotation sensor connected to the pendulum, and a controller connected to the motion sensor and to the position sensor and to the rotation sensor. The wave energy converter also has a conditioner means for conditioning an electrical energy produced by the variable inductance means. The conditioner means is connected to the variable inductance means.

At least one battery can be connected to the controller, the motion sensor, the position sensor, the rotation sensor, and the pendulum adjusting means. A charger is connected to the battery. A solar panel is connected to the charger. A mounting assembly is positioned in the shell. The mounting assembly has at least one bearing connected to the pendulum. The magnet can be an electromagnet.

In one embodiment, the pendulum comprises an elongate member, a shaft connected to the elongate member and positioned perpendicular to a longitudinal axis of the elongate member, and a disk is positioned on the shaft. The shaft is positioned perpendicular to a longitudinal axis of the elongate member. The shaft extends through a center of the disk. The magnet is positioned on the disk. The disk oscillates the magnet adjacent the wire coil.

In another embodiment, the pendulum comprises an elongate member, a linkage pivotally connected to the elongate member, and a rod pivotally connected to the linkage. The magnet is positioned on the rod. The rod oscillates the magnet adjacent the wire coil. The shell is impermeable to moisture and contaminants.

In another embodiment, the wave energy converter comprises a shell, a pendulum pivotally positioned in the shell, a link pivotally connected to the pendulum, an actuator having a piston and a cylinder, a hydraulic rectifier connected to the actuator, a motor connected to the hydraulic rectifier, a generator connected to the motor, and a pendulum adjusting means for changing a center of gravity of the pendulum. The pendulum has a magnet thereon. The piston is pivotally connected to the link. The motor is driven by a hydraulic fluid pumped by the actuator through the hydraulic rectifier. The motor turns the generator so as to produce electrical energy. The shell is impermeable to moisture and contaminants. The wave energy generator further comprises a motion sensor positioned in the shell, a position sensor connected to the pendulum, and a controller connected to the motion sensor. The controller activates the pendulum adjusting means upon receiving a signal from the motion sensor and a signal from the position sensor.

In a further embodiment, the apparatus for converting a mechanical energy to an electrical energy comprises a shell receiving the mechanical energy, a pendulum pivotally positioned in the shell, a variable inductance means for varying an inductive capacity positioned in the shell, and a pendulum adjusting means for changing a center of gravity of the pendulum. The pendulum has a magnet. The shell transmits the mechanical energy to the pendulum so as to cause the pendulum to oscillate back-and-forth. The magnet of the pendulum oscillates adjacent the variable inductance means so as to generate the electrical energy. The apparatus further comprises a motion sensor positioned adjacent the shell, a position sensor connected to the pendulum, a rotation sensor connected to the pendulum, and a controller connected to the motion sensor and to the position sensor and to the rotation sensor. A conditioner means conditions the electrical energy produced by the variable inductance means. The conditioner means is connected to the variable inductance means. At least one battery is connected to the controller, the motion sensor, the position sensor, the rotation sensor, and the pendulum adjusting means. A charger is connected to the battery. A solar panel is connected to the charger. The shell is impermeable to moisture and contaminants.

In still a further embodiment of the present invention, the pendulum comprises an elongate member, a shaft connected to the elongate member, and a disk positioned on the shaft. The shaft is positioned perpendicular to a longitudinal axis of the elongate member. The shaft extends through a center of the disk. The magnet is positioned on the disk. The disk oscillates the magnet adjacent the variable inductance means. The pendulum can also comprise an elongate member, a linkage pivotally connected to the elongate member, and a rod pivotally connected to the linkage. The magnet is positioned on the rod. The rod oscillates the magnet adjacent the variable inductance means.

DETAILED DESCRIPTION OF THE INVENTION

Figure 1:
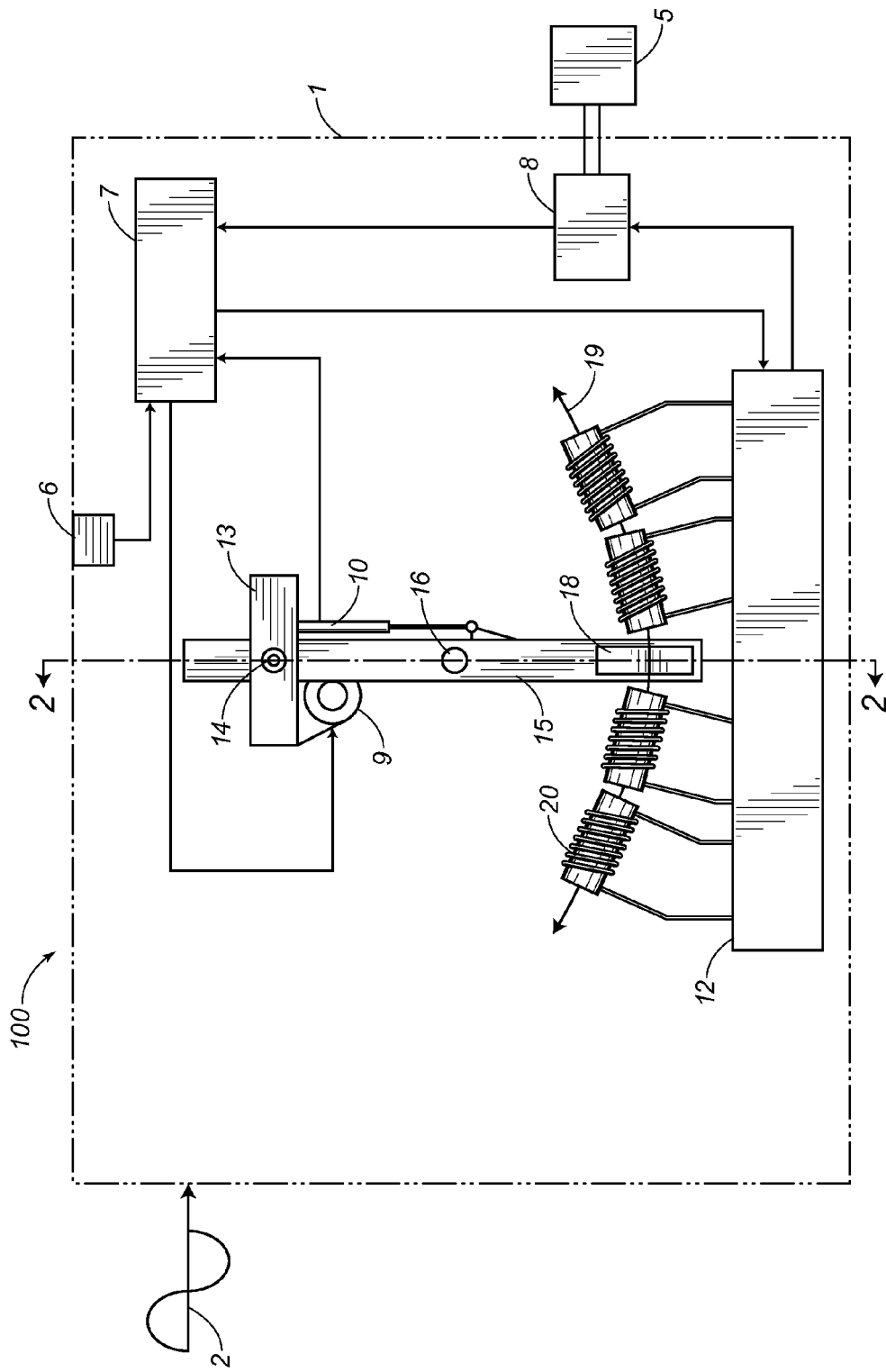
FIG. 1 shows a side elevational view of a preferred embodiment of the wave energy converter of the present invention.

Referring to FIG. 1, there is shown a side-elevational view of the preferred embodiment of the wave energy converter 100 of the present invention. The wave energy converter 100 has a shell 1, a pendulum 15 pivotally positioned in the shell 1, and a variable inductance means 12 positioned in the shell 1. The pendulum 15 has a magnet 18 placed thereon. The pendulum 15 has a center of gravity 16. The pendulum 15 oscillates about a longitudinal axis of a rod 14. The rod 14 is connected to the shell 1 by bearings (not shown). The variable inductance means 12 shown in FIG. 1 has wire coils 20. The magnet 18 of the pendulum 15 oscillates adjacent the wire coils 20 so as to produce electricity through electromagnetic induction. The variable inductance means 12 can vary the inductive capacity of the wave energy converter 100. That is, the variable inductance means 12 can increase or decrease selectively the number of wire coils 20 that are active so as to generate more or less electricity by electromagnetic induction. The wire coils 19 of the variable inductance means 12 are similar to the stator of a typical generator. The magnet 18 of the pendulum 15 is similar to the rotor of a typical generator. The path of the oscillating magnet 18 is shown by double-arrowed line 19.

In the present invention, a mechanical energy, such as a wave 2, is imparted upon the shell 1. Because the pendulum 15 is connected to the shell 1, any energy imparted onto the shell 1 is transferred to the pendulum 15. Although mechanical energy can be exerted upon the shell 1 in any three-dimensional direction, for the purpose of mathematical simplicity, only the applied horizontal motion of the wave 2 against the shell 1 demonstrates the efficiency of the wave energy converter 100 of the present invention. The following equation is the basic differential equation of motion for a pendulum 15 that is acted upon by an external force at its pivot along with a damping force:

$$I\theta'' + c\theta' + mgd\theta = -mx'' \qquad \text{eqn.(1)}$$

The symbol "I" is the moment of inertia the pendulum 15. The symbol "c" is the damping coefficient. The symbol "m" is the mass of the pendulum 15. The symbol "g" is the gravitational constant. The symbol "d" is the distance between the center of gravity 16 of the pendulum 15 and the pivot axis 14 of the pendulum 15. The symbol "x''" is the acceleration of the pendulum 15 as a function of the mechanical energy, i.e. wave, acting upon the wave energy converter 100. For simplicity purposes, x'' and θ are considered sinusoidal-varying functions expressed in terms of a single circular frequency, ω, and time, t. Applying the sinusoidal functions and rewriting the equation produces the following equation:

$$I\Theta\omega^2 \ast \sin(\omega t - \phi + \pi) + c\Theta\omega \ast \sin(\omega t - \phi + \pi/2) + mgd\Theta \ast \sin(\omega t - \phi) = mx\omega^2 \ast \sin(\omega t) \qquad \text{eqn.(2)}$$

As known from the study of mechanical system dynamics, a system acting under the influence of a time-varying force will experience resonance when the frequency of the time-varying force is equal to the natural frequency of the system itself. The resonance condition represents the condition of maximum energy transfer between the time-varying force and the mechanical system. The natural frequency of a pendulum is strictly based on the distance between the center of gravity of the pendulum and the pivot axis of the pendulum, independent of the mass of the pendulum.

Thus, the pendulum 15 of the present invention has a pendulum adjust means 9 that adjusts the distance between the center of gravity 16 of the pendulum 15 and the pivot axis 14 of the pendulum 15. The pendulum adjusting means 9 move the pendulum up and down relative to the mounting assembly 13 so as to change the distance of the center of gravity 16 and the pivot axis 14. A greater distance between center of gravity 14 and the pivot axis 14 of the pendulum 15 causes the pendulum 15 to oscillate more slowly. A small distance between the center of gravity 16 and the pivot axis 14 of the pendulum 15 causes the pendulum 15 to oscillate more quickly. Thus, if wave 2 has a high frequency of recurrence, the pendulum adjusting means 9 adjusts the distance between the center of gravity 16 and the pivot axis 14 so that the pendulum will swing quicker so as to achieve a harmonic resonance with the frequency of the wave 2 and thus optimize the amount of electricity generated between the magnet 18 and the wire coils 19 of the variable inductance means 12. If the frequency of the wave 2 is low, then the pendulum adjusting means 9 increases the distance between the center of gravity 16 and the pivot axis 14 so that the pendulum 15 swings, or oscillates, more slowly so as to match the harmonic resonance of the waves 2 and optimize the generation of electricity between the magnet 18 and the wire coils 20.

The circular natural frequency of the pendulum is expressed as a function of the distance between the center of gravity 16 of the pendulum 15 and the pivot axis 14 of the pendulum 15 by the following equation:

$$\omega = (g*d/0.083*L^2*d^2)^0.5 \qquad \text{eqn.(3)}$$

The symbol "d" is the distance between the center of gravity 16 of the pendulum 15 and the pivot axis 14 of the pendulum 15. The symbol "L" is the length of the pendulum 15, which is constant because the length of the pendulum 15 is always the same. "ω" and "g" were defined above.

The above equation is used by a controller 7 positioned in the shell 1. A motion sensor 6 is positioned in the shell 1 senses the frequency of the wave 2. This frequency is then used in the above equation as the circular natural frequency of the pendulum 15, and the controller 7 then calculates the distance d that is needed between the center of gravity 16 of the pendulum 15 and the pivot axis 14 of the pendulum 15 so as to have the pendulum 15 match the frequency of the wave 2. Manipulation of the symbol "d" effects both the inertial and gravitational terms of the second equation above. Once the controller 7 knows the distance needed for the pendulum 15, the pendulum adjusting means 9 is activated by the controller 7 so as to change the distance between the center of gravity 16 and the pivot axis 14. The position sensor 10 communicates the position of pendulum 15 to the controller 7.

The damping term, $c\Theta\omega$, of second equation is a mathematical expression for the rate of energy removal from the WEC 100. Varying this term controls the rate at which energy is converted from mechanical energy to electrical energy. The rate as which energy is converted from mechanical energy to electrical energy in the WEC 100 of the present invention can be varied by controlling the amplitude of the motion of the pendulum 15 along path 19. The amplitude of the pendulum 15 can be controlled with a brake disk and caliper operatively connected to the pivot axis 14 of the pendulum 15. Controlling the amplitude of the motion of the pendulum 15 allows the wave energy converter 100 to be designed to operate over a defined range of motion which is useful in determining the overall dimensions of the pendulum 15.

Referring still to FIG. 1, the magnet 18 is located on pendulum 15 so that the magnet 18 passes adjacent the wire coils 20. Electricity is generated by the oscillation of the magnet 18 past the wire coils 20 by magnetic or electromagnetic induction. Induction occurs when a magnetic field moves relative to a conductor. In the present invention, the magnetic field is provided by the magnet 18. The conductor is the wire coils 20 of the variable inductance means 12. The magnet 18 is also referred to as the rotor. The wire coils 20 are also referred to as the stator 20. If the pendulum 15 is still, then the magnet 18 does not move and no induction occurs. Thus, it is important for the magnet 18 to oscillate as much as possible so as to generate maximum amount of electricity. The point at which the magnet 18 and wire coils 20 generate the maximum amount of electricity is when the frequency of the pendulum 15 is in harmonic resonance with the frequency of the waves 2. The configurations of the pendulum 15, the pendulum adjusting means 9, the controller 7, and position sensor 10 allow the wave energy converter 100 of the present invention to maximize the electricity generated by achieving a harmonic frequency for any given wave 2. The electrical energy generated in the wire coils 20 of the variable inductance means 12 is conditioned in the conditioner means 8 and then sent as electricity for use by a load 5, such as a typical electrical power grid. Electricity can travel to and from the wave energy converter 100 by way of the connection between the conditioner means 8 and the load 5. Thus, any electrical energy needed by the components of the wave energy converter 100, such as the controller 7, can be provided by the load 5 if the pendulum 15 and wire coils 20 are not generating enough electrical energy. The controller 7 is connected to the variable inductance means 12 so as to control the inductive capacity of the variable inductance means 12.

Figure 2:
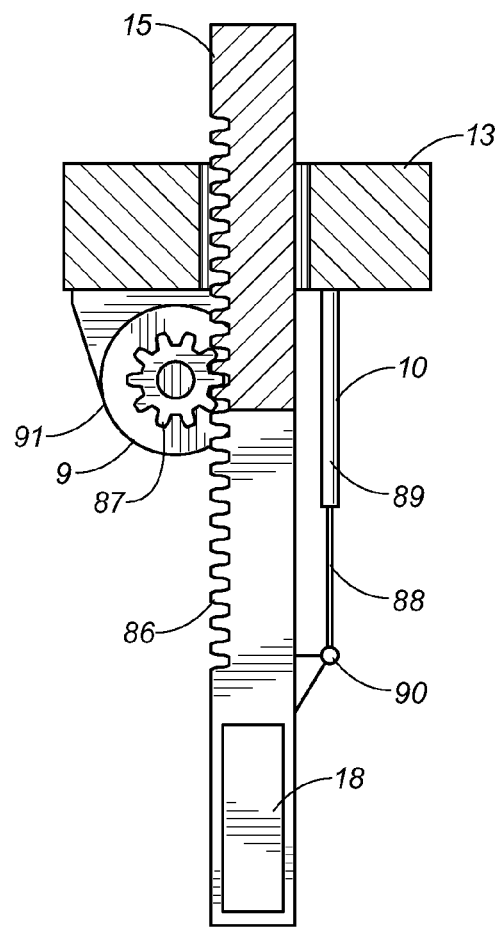
FIG. 2 shows a cross-sectional view of the pendulum of the preferred embodiment of the present invention, taken along sight line 2-2 in FIG. 1.

Referring to FIG. 2, there is shown a cross-sectional view of the pendulum 15 of the wave energy converter 100 of the present invention, taken along sight line 2-2 of FIG. 1. The pendulum 15 moves up and down through the mounting assembly 13 by the motion of the pendulum adjusting means 9. The pendulum adjusting means 9 has a cog wheel 87 that is rotated by a motor 91. The motor 91 is activated by the controller (not shown). Teeth 86 are formed in the side of the pendulum 15 so as to operatively cooperate with the cog wheel 87 of the pendulum adjusting means 9. Although the embodiment of the pendulum adjusting means 9 shown in FIG. 1 includes a motor 91, cog wheel 87, and teeth 86, the pendulum adjusting means 9 can include any mechanism suitable for moving the pendulum 15 up and down such as a lever assembly, a hydraulic assembly, a magnetic assembly, an electrical assembly, or any other assembly. The position sensor 10 communicates with the controller (not shown) regarding the distance between the center of gravity 16 and the pivot axis of the pendulum 15. As the pendulum 15 moves up and down, the rod 88 of the position sensor 10 moves into and out of the housing 89 of the position sensor 10. The rod is secured to the pendulum 15 by anchor 90. The housing 89 is secured to the mounting assembly 13. The position sensor 10 sends a signal to the controller concerning the height of the pendulum 15 that is determined by the extent to which the rod 88 extends from the housing 89 of the position sensor 10.

Figure 3:
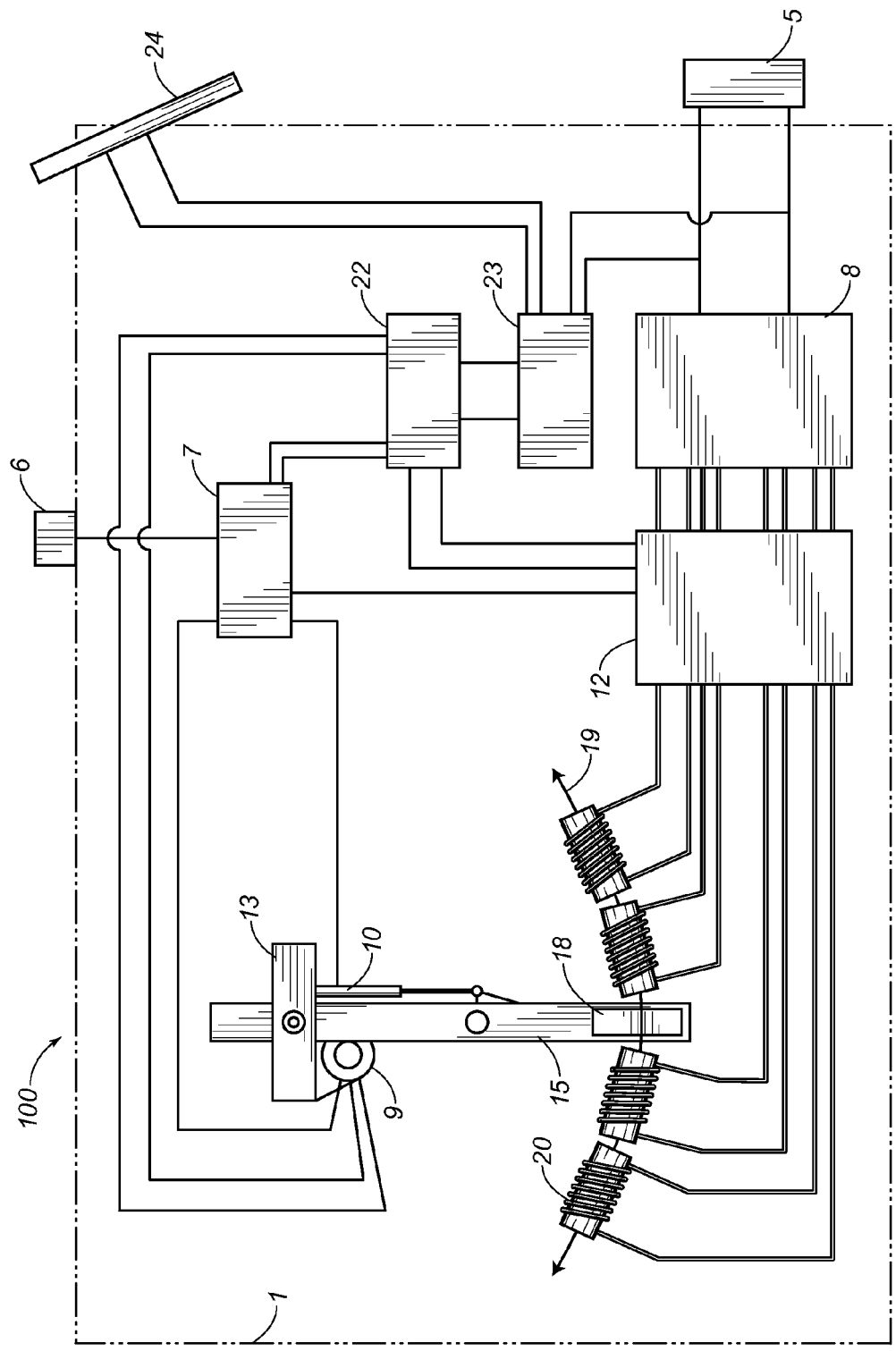
FIG. 3 shows a side elevational view of the preferred embodiment of the wave energy converter of present invention, with batteries and a solar panel.

Referring to FIG. 3, there is shown a side elevational view of the preferred embodiment of the wave energy converter 100 of present invention, with batteries 22 and a solar panel 24. The batteries 22 provide electrical energy for components of the wave energy converter 100, such as the controller 7 and the pendulum adjusting means 9. The batteries 22 can be charged by charger 23. The charger receives electrical energy so as to charge the batteries 22. Electrical energy for the charger 23 can be provided by the solar panel 24 or by the load 5. The solar panel 24 can be mounted to the shell 1 of the wave energy converter 100. The arrangement of the wave energy converter 100 in FIG. 3 is the same as that in FIG. 1, except that a battery 22, a charger 23, and solar panel 24 have been added to the wave energy converter 100. The solar panel 24 can be a photovoltaic cell.

Figure 4:
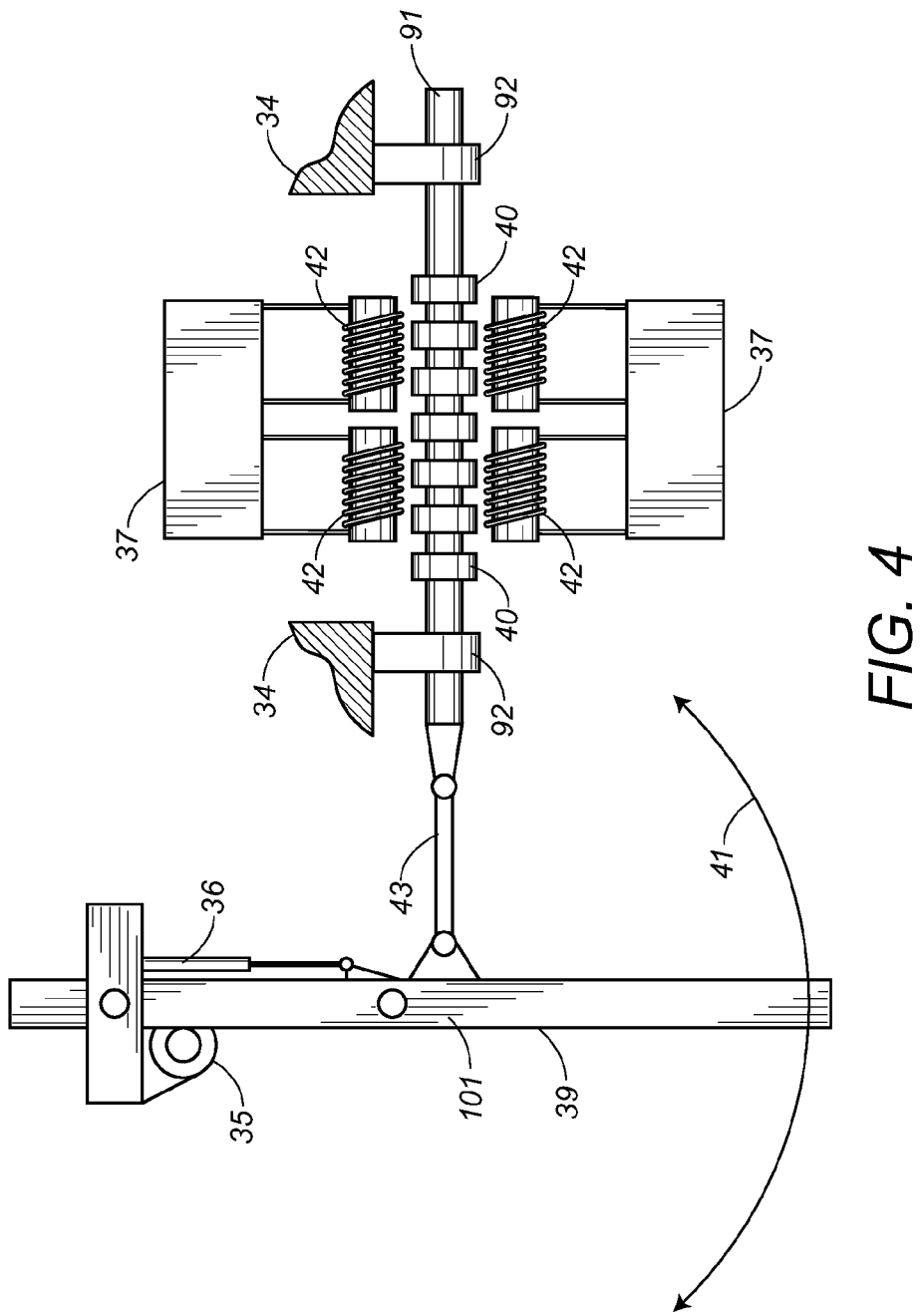
FIG. 4 shows an isolated side-elevational view of a second embodiment of the rotor and stator of the wave energy converter of the present invention.

Referring to FIG. 4, there is shown an isolated side-elevational view of the rotor and stator a second embodiment of the present invention. The rotor is the pendulum 39 with magnets 40 thereon. The pendulum 39 has an elongate member 101, a linkage 43 pivotally connected to the elongate member 101, and a rod 91 pivotally connected to the linkage 43. The linkage 43 is pivotally connected to the pendulum 39 and to the rod 91. A number of magnets 40 are placed on the rod 91. As the elongate member 101 of the pendulum 39 swings along path 41, the rod 91 moves horizontally through mounts 92. The mounts 92 are attached to the shell 34. Thus, as waves or mechanical energy hit the shell 34, the pendulum 39 oscillates along path 41 so as to move the magnets 40 on rod 91 horizontally through the wire coils 42 of the variable inductance means 37. The distance between the center of gravity and the pivot axis of the pendulum 39 is adjusted by the communications among the pendulum adjusting means 35, the position sensor 36, and the controller (not shown). The stator of the second embodiment is the wire coils 42 of the variable inductance means 37.

Figure 5:
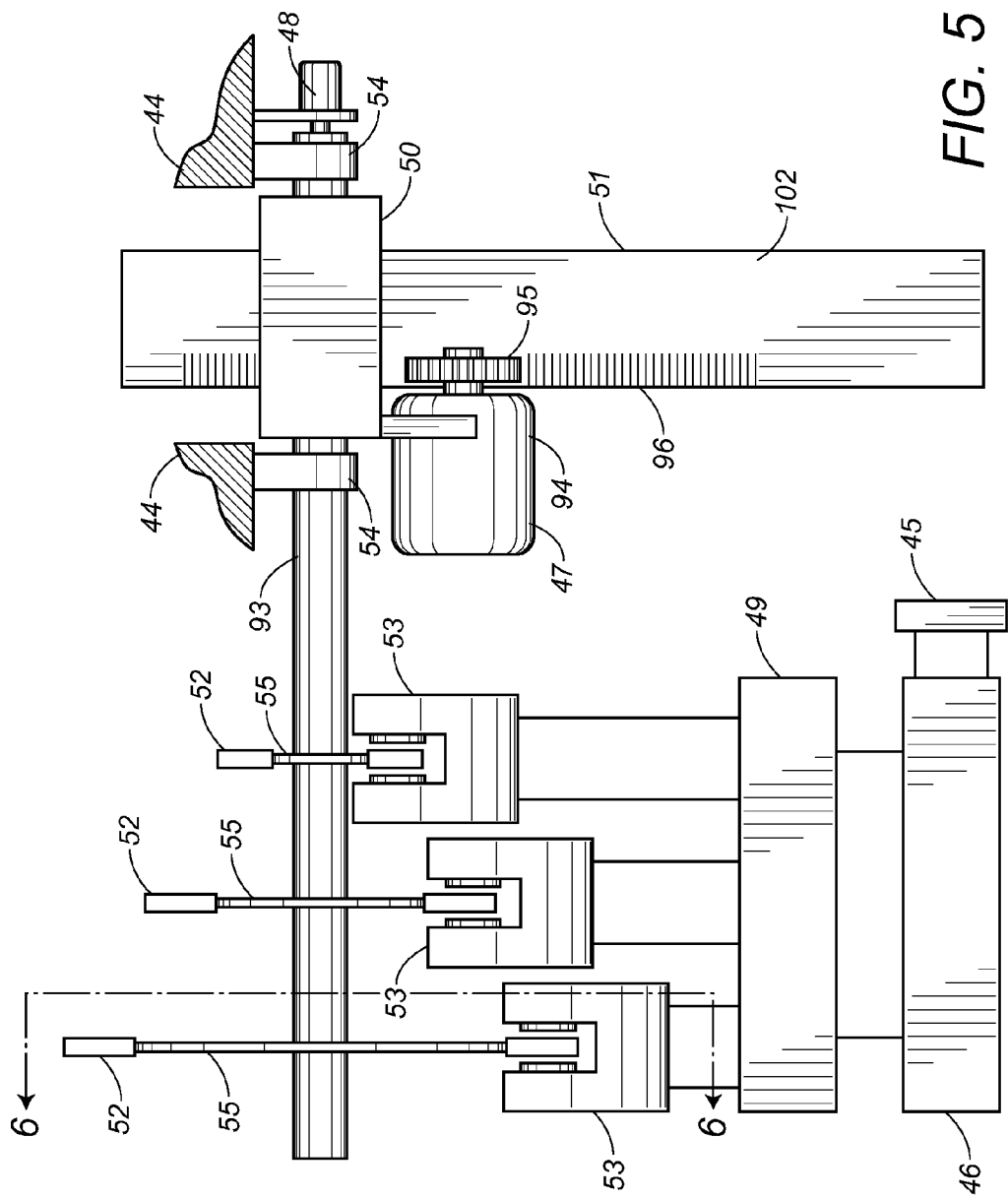
FIG. 5 shows an isolated side-elevational view of a third embodiment of the rotor and stator of the wave energy converter of the present invention.

Referring to FIG. 5, there is shown an isolated cross-sectional of the rotor and stator of a third embodiment of the present invention. The rotor is the pendulum 51. The pendulum 51 has an elongate member 102, a shaft 93, and disks 55 having magnets 52 thereon. The shaft 93 is connected to the elongate member 102. The shaft 93 is perpendicular to a longitudinal axis of the elongate member 102. The disks 55 and their respective magnets 52 rotate through wire coils 53 of the variable inductance means 49 as the pendulum 51 oscillates. That is, as the elongate member 102 oscillates the shaft 93, the shaft 93 oscillates the disks 55. The disks 55 have a small thickness, and the magnets 52 rotate between wire coils 53. The stator of the third embodiment is the wire coils 53 of the variable inductance means 49. The electrical energy generated by the variable inductance means 49 is sent to the conditioner means 46 where electricity is conditioned for transmission to the load 45. The pendulum 51 is connected to the housing 44 by the mounting assembly 50. The mounting assembly 50 has bearings 54 that allow for easy oscillation of the pendulum 51 within the shell 44. The pendulum adjusting means 47 is mounted to the mounting assembly 50. The pendulum adjusting means 47 has a motor 94 that drives a cog wheel 95. The motor 94 is mounted to the mounting assembly 50. The cog wheel 95 engages the teeth 96 formed in the side of the pendulum 51. The motor 94 rotates the cog wheel 95 so as to raise the pendulum 51 up and down. The bearing 54 of the mounting assembly 50 can be a bushing. A rotation sensor 48 is placed adjacent the mounting assembly 50. The rotation sensor 48 measures the angular position and the angular velocity of the pendulum 51.

Figure 6:
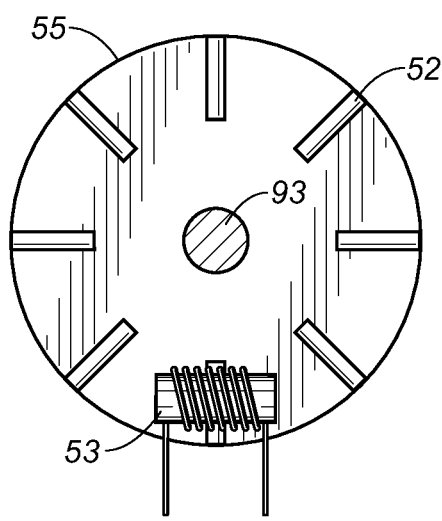
FIG. 6 shows a cross-sectional view of the rotor and stator of the third embodiment of the wave energy converter of the present invention, taken along sight line 6-6 in FIG. 5.

Referring to FIG. 6, there is shown a cross-sectional view of the disk 55 and wire coil 53, taken along site line 6-6 of FIG. 5. The disk 55 is mounted on the shaft 93. The shaft 93 extends through a center of the disk 55. Magnets 52 are positioned on the periphery of the disk 55. The magnets 52 oscillate past the wire coils 53 as the pendulum 51 oscillates. The pendulum 51 turns the shaft 93 which turns the disk 55. Thus, the disk 55 causes the magnet fields provided by the magnets 52 to move relative to the coils 53.

Figure 7:
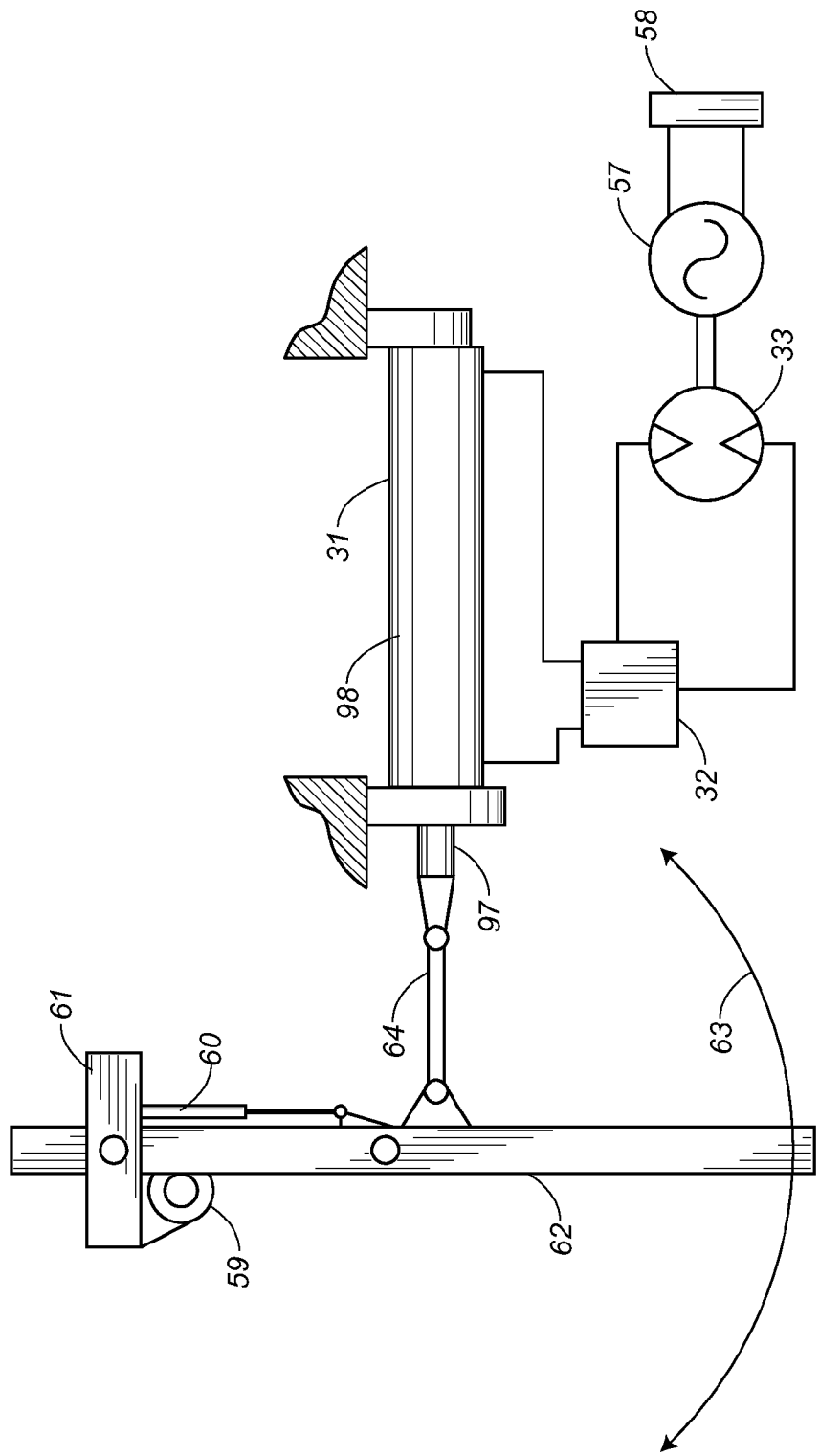
FIG. 7 shows an isolated side-elevational view of a fourth embodiment of the rotor and stator of the wave energy converter of the present invention.

Referring to FIG. 7, there is shown an isolated side-elevational view of the rotor and stator of the fourth embodiment of the present invention. Electrical energy is generated in the fourth embodiment by turning the rotor with respect to stator in the electrical energy converter 57. The rotor of the electrical energy converter 57 is moved by a motor means 33 that is driven by the motion of the pendulum 62. As a wave imparts mechanical energy on the shell of the wave energy converter, the pendulum 62 oscillates along path 63. A link 64 is pivotally connected to the pendulum 62. An actuator 31 is pivotally connected to the link 64. The actuator 31 is a hydraulic actuator and has a piston 97 and cylinder 98. The piston 97 is pivotally connected to the link 64. The piston 97 moves in and out of the cylinder 98 as the pendulum 62 oscillates along path 63. Hydraulic fluid is pumped from the cylinder 98 to the hydraulic rectifier 32. The hydraulic rectifier 32 concentrates the mechanical energy of the actuator 31 and sends the mechanical energy 32 to the motor means 33. In this embodiment, the motor means 33 is a hydraulic motor that is driven by hydraulic fluid from the hydraulic rectifier 32. The hydraulic motor 33 turns the rotor relative to the stator in the electrical energy converter 57. Electrical energy, i.e., electricity, is sent to the load 58. The pendulum 63 has a mounting assembly 61. The position sensor 60 is mounted to the mounting assembly 61 and senses the position the pendulum 62. The pendulum adjusting means 59 adjusts the position of the pendulum 62.

Figure 8:
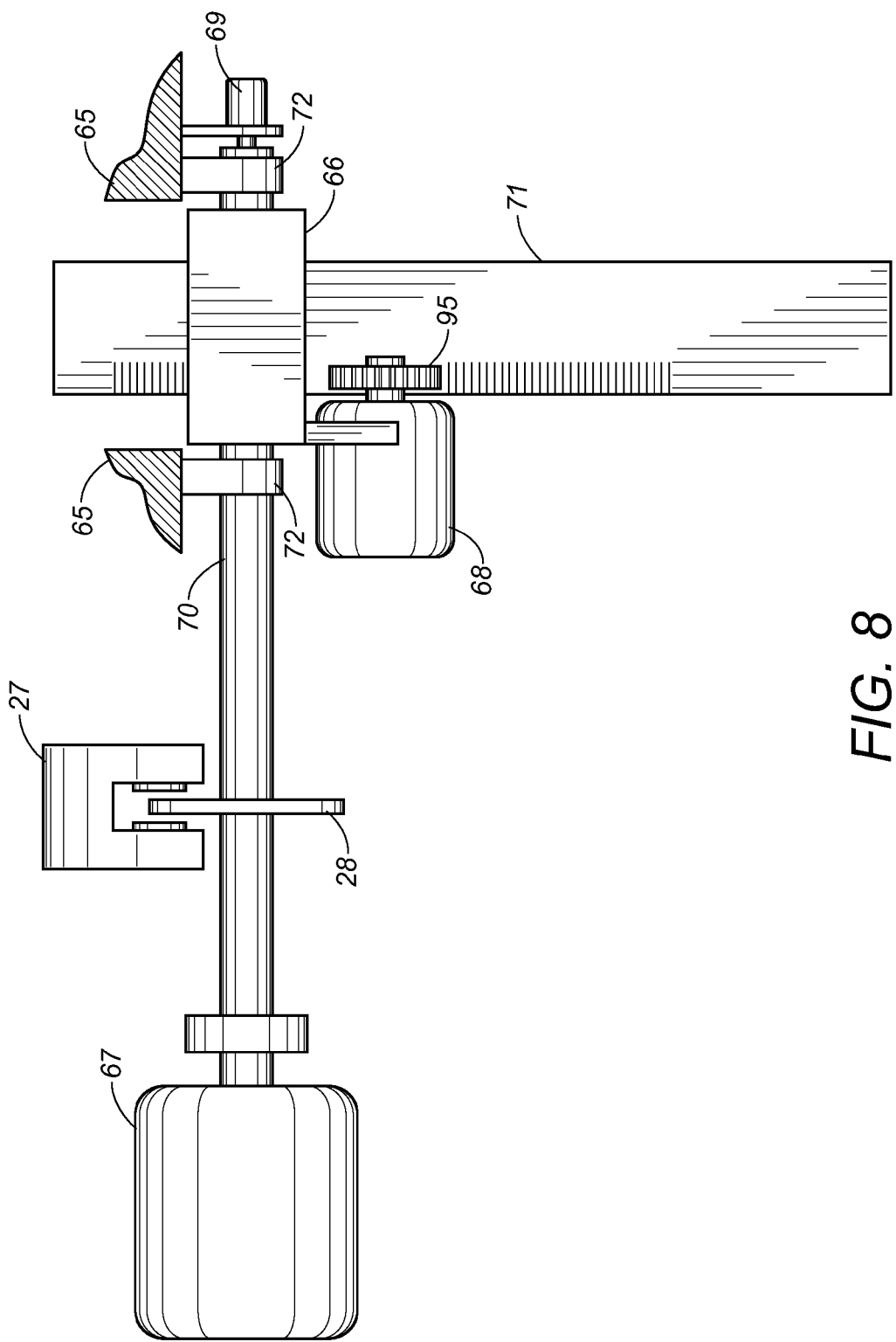
FIG. 8 shows an isolated side-elevational view of a fifth embodiment of the rotor and stator of the wave energy converter of the present invention.

Referring to FIG. 8, there is shown an isolated side-elevational view of rotor and stator of a fifth embodiment of the present invention. The pendulum 71 is moved up and down by the pendulum adjusting means 68. The pendulum 71 is held within the mounting assembly 66. The pendulum adjusting means 68 adjusts the pendulum 71 up and down within the mounting assembly 66. Bearing 72 connects the mounting assembly 66 to the shell 65. The pendulum 71 imparts oscillatory motion upon the rod 70. The rod 70 oscillates a rotor in the electrical energy converter 67 relative to the stator located in the electrical energy converter 67. A rotation sensor 69 is located adjacent the bearings 72. The amplitude of the motion of the pendulum 71 is controlled by a caliper 27 and brake disk 28 arrangement. Free movement of the pendulum 71 is allowed by the calipers 27 when the calipers 27 do not touch the brake disk 28. If the amplitude of the pendulum 71 needs to be decreased, the calipers 27 press against the brake disk 28 so as to dampen the movement of the pendulum 71.

Figure 9:
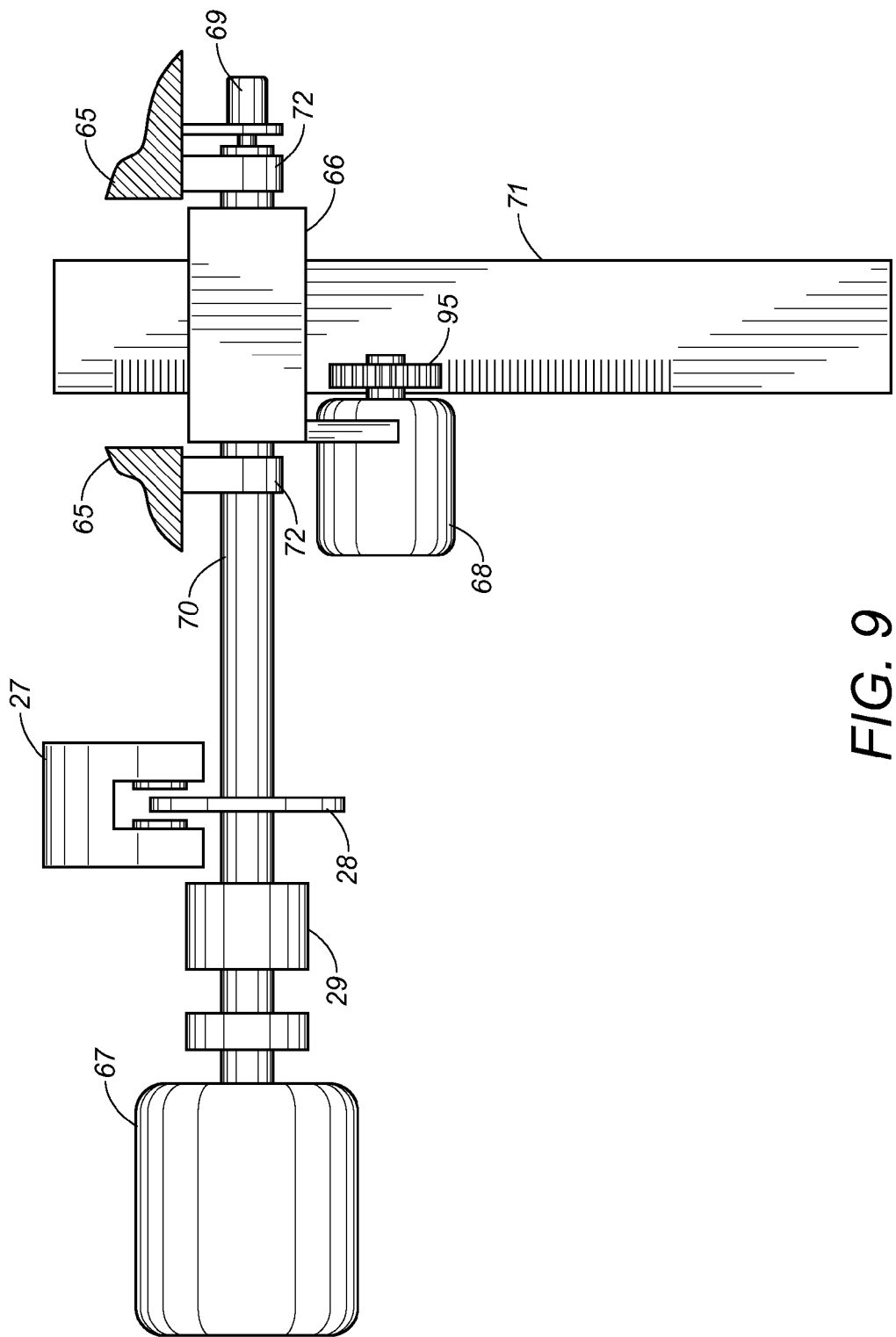
FIG. 9 shows a side-elevational view of the fifth embodiment, with a clutch attached thereto.

Referring to FIG. 9, there is shown a isolated side-elevational view of the fifth embodiment of the present invention, with a clutch 29. The clutch 29 allows the rod 70 to engage and disengage from the electrical energy converter 67. The brake 28 and calipers 27 operate similarly to those in FIG. 8.

Figure 10:
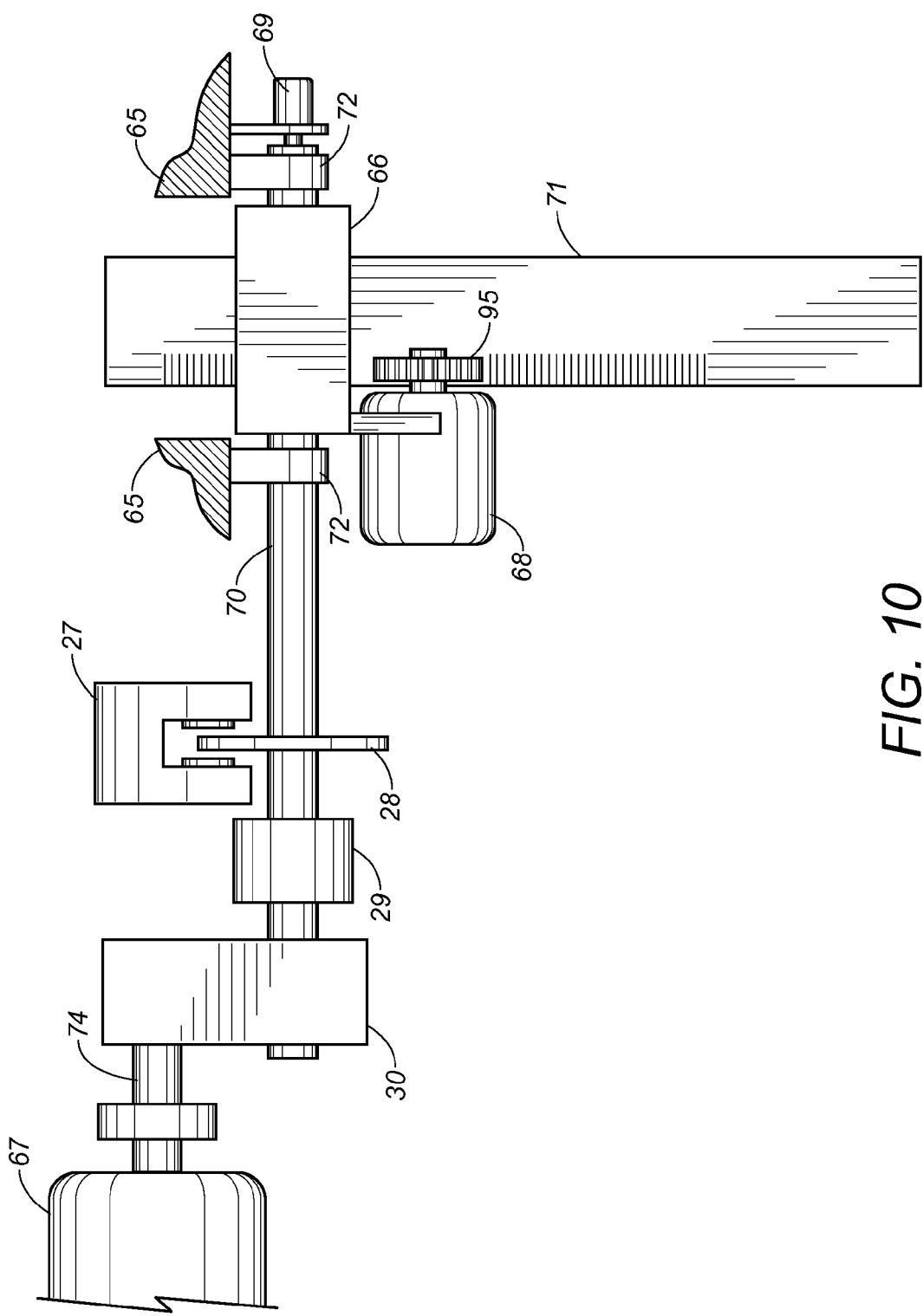
FIG. 10 shows a side-elevational view of the fifth embodiment, with a clutch and gear box attached thereto.

Referring to FIG. 10, there is shown an isolated side-elevational view of the fifth embodiment of the present invention, with a clutch 29 and gear box 30. The configuration in FIG. 10 is similar to that of FIG. 9, except that a gear box 30 has been added. The pendulum 71 turns the rod 70, which turns gears in the gear box 30. A mechanical energy is imparted by the gear box 30 on axle 74 which turns a rotor relative to the stator in the electrical energy converter 67. Thus, the fifth embodiment of the present invention has a transmission with a clutch 29 and gear box 30. The brake system consisting of the caliper 27 and brake disk 28 dampens the movement of the pendulum 71.

Figure 11:
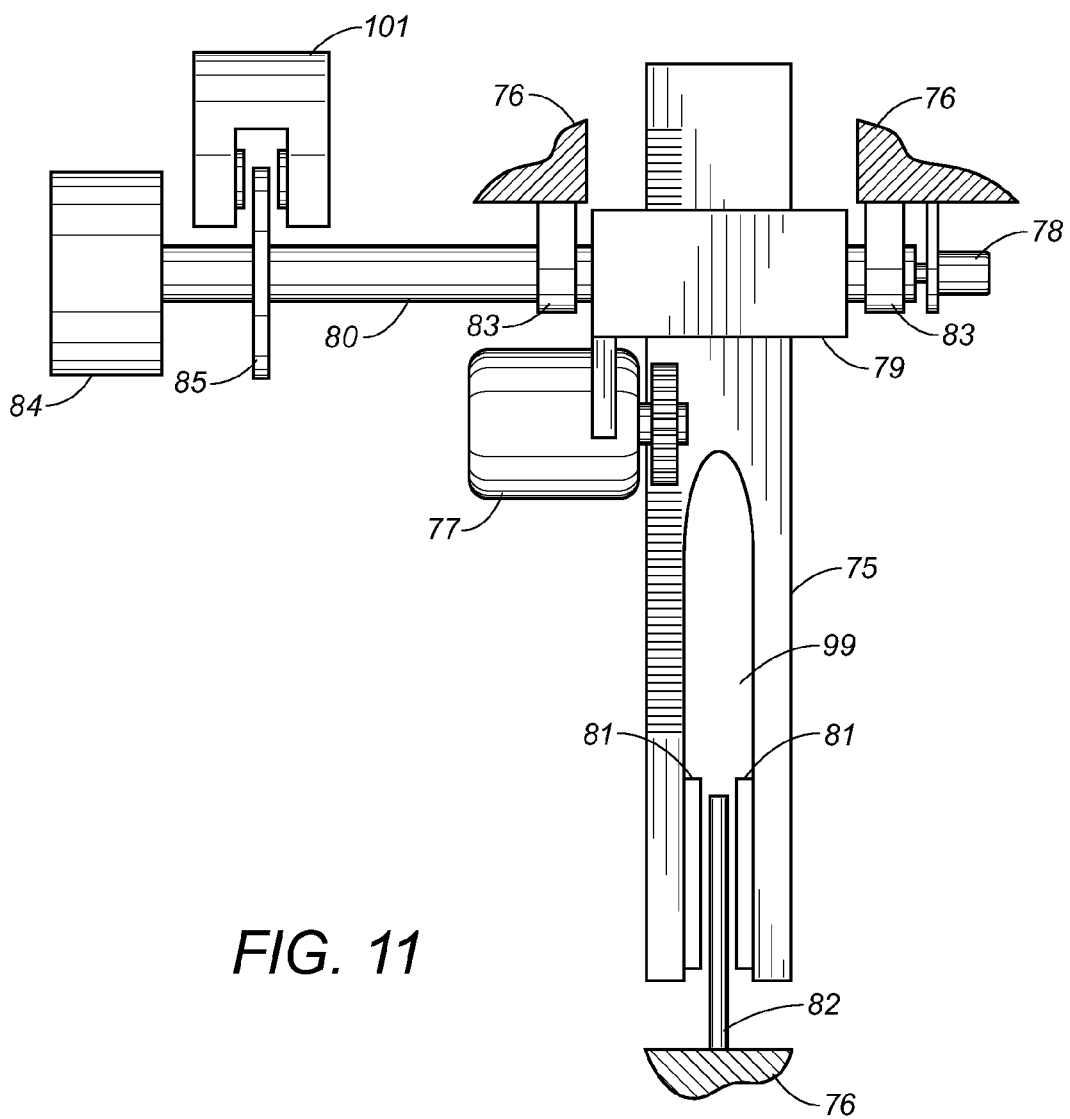
FIG. 11 shows an isolated side-elevational view of a sixth embodiment of the rotor and stator of the wave energy converter of the present invention.

Referring to FIG. 11, there is shown an isolated side-elevational view of the rotor and stator of the sixth embodiment of the present invention. The pendulum 75 has a split 99 formed therein. Magnets 81 are placed on the walls of the split 99. Magnets 81 pass around the magnets of the variable inductance means 82. The variable inductance means 82 is connected to the shell 76. The pendulum 76 turns rod 80 which turns the rotor relative to the stator in the electrical energy converter 84. A caliber can dampen the motion of the brake disk 85 so as to control the motion of the pendulum 75. The pendulum adjusting means 77 adjusts the height of the pendulum 75. The pendulum adjusting means 77 is mounted to the mounting assembly 79. The bearings 83 are adjacent the mounting assembly 79. Rotation sensor 78 is placed adjacent the bearing 83. The bearings 83 are mounted to the shell 76. The rod 80 oscillates with the pendulum 75 within the bearings 83.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A wave energy converter comprising:
   a shell;
   a pendulum pivotally positioned in said shell, said pendulum having a magnet thereon;
   a variable inductance means for varying an inductive capacity, said variable inductance means being positioned in said shell, said variable inductance means having at least one wire coil, said magnet of said pendulum oscillating relative to the wire coil; and
   a pendulum adjusting means operatively connected to said pendulum for changing a center of gravity of said pendulum.

2. The wave energy converter of claim 1, further comprising:
   a motion sensor positioned in said shell;
   a position sensor connected to said pendulum;
   a rotation sensor connected to said pendulum; and
   a controller connected to said motion sensor and said position sensor and said rotation sensor.

3. The wave energy converter of claim 2, further comprising:
   a conditioner means for conditioning an electrical energy produced by said variable inductance means, said conditioner means being connected to said variable inductance means.

4. The wave energy converter of claim 2, further comprising:
   at least one battery connected to said controller and to said motion sensor and to said position sensor and to said rotation sensor and to said pendulum adjusting means;
   a charger connected to the battery; and
   a solar panel connected to said charger.

5. The wave energy converter of claim 1, said magnet being an electromagnet.

6. The wave energy converter of claim 1, further comprising:
   amounting assembly positioned in said shell, said mounting assembly having at least one bearing connected to said pendulum.

7. The wave energy converter of claim 6, said pendulum adjusting means comprising:
   a motor mounted to said mounting assembly;
   a cog wheel rotatably connected to said motor; and
   a plurality of teeth formed on a side of said pendulum, said cog wheel suitable for engaging said plurality of teeth.

8. The wave energy converter of claim 1, said pendulum comprising:
   an elongate member;
   a shaft connected to said elongate member, said shaft extending transverse to a longitudinal axis of said elongate member; and
   a disk positioned on said shaft, said magnet being positioned on said disk.

9. The wave energy converter of claim 1, said pendulum comprising:
   an elongate member;
   a linkage pivotally connected to said elongate member; and
   a rod pivotally connected to said linkage, said magnet being positioned on said rod.

10. The wave energy converter of claim 1, said shell being impermeable to moisture.

11. An apparatus for converting a mechanical energy to an electrical energy comprising:
    a shell suitable for receiving the mechanical energy;
    a pendulum pivotally positioned in said shell, said pendulum having a magnet, said shell suitable for transmitting the mechanical energy to said pendulum so as to cause said pendulum to oscillate;
    a variable inductance means for varying an inductive capacity, said variable inductance means being positioned in said shell, said magnet of said pendulum oscillating adjacent said variable inductance means so as to generate the electrical energy; and
    a pendulum adjusting means operatively connected to said pendulum for changing a center of gravity of said pendulum.

12. The apparatus of claim 11, further comprising:
    a motion sensor positioned adjacent said shell;
    a position sensor connected to said pendulum;
    a rotation sensor connected to said pendulum; and
    a controller connected to said motion sensor and said position sensor and said rotation sensor.

13. The apparatus of claim 12, further comprising:
    a conditioner means for conditioning the electrical energy produced by said variable inductance means, said conditioner means being connected to said variable inductance means;
    a rod connected to said pendulum along a pivot axis of said pendulum;
    a brake disk mounted on said rod; and
    a caliper mounted on said brake disk, said caliper pressing against said brake disk so as to dampen a motion of said disk and said rod and said pendulum.

14. The apparatus of claim 13, further comprising:
    at least one battery connected to said controller and to said motion sensor and to said position sensor and to said rotation sensor and to said pendulum adjusting means;
    a charger connected to the battery; and
    a solar panel connected to said charger.

15. The apparatus of claim 11, said pendulum comprising:
    an elongate member;
    a shaft connected to said elongate member, said shaft being positioned perpendicular to a longitudinal axis of said elongate member; and
    a disk positioned on said shaft, said magnet being positioned on said disk, said disk suitable for oscillating said magnet adjacent said variable inductance means.

16. The apparatus of claim 11, said pendulum comprising:
    an elongate member;
    a linkage pivotally connected to said elongate member; and
    a rod pivotally connected to said linkage, said magnet being positioned on said rod, said rod suitable for oscillating said magnet adjacent said variable inductance means.

17. The apparatus of claim 14, said shell being impermeable to moisture.

* * * * *